(12) United States Patent
Ling et al.

(10) Patent No.: US 12,172,548 B2
(45) Date of Patent: Dec. 24, 2024

(54) VEHICLE, ENERGY CONVERSION DEVICE AND CONTROL METHOD THEREOF

(71) Applicant: BYD COMPANY LIMITED, Shenzhen (CN)

(72) Inventors: Heping Ling, Shenzhen (CN); Hua Pan, Shenzhen (CN); Feiyue Xie, Shenzhen (CN); Ri Huang, Shenzhen (CN); Yihao Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 68 days.

(21) Appl. No.: 17/790,398

(22) PCT Filed: Dec. 10, 2020

(86) PCT No.: PCT/CN2020/135183
§ 371 (c)(1),
(2) Date: Jun. 30, 2022

(87) PCT Pub. No.: WO2021/135888
PCT Pub. Date: Jul. 8, 2021

(65) Prior Publication Data
US 2023/0038790 A1    Feb. 9, 2023

(30) Foreign Application Priority Data

Dec. 31, 2019  (CN) .......................... 201911409880.7

(51) Int. Cl.
*B60L 58/27* (2019.01)
*H01M 10/42* (2006.01)
(Continued)

(52) U.S. Cl.
CPC ......... *B60L 58/27* (2019.02); *H01M 10/4264* (2013.01); *H01M 10/441* (2013.01);
(Continued)

(58) Field of Classification Search
CPC .................................. B60L 50/50; B60L 58/27
See application file for complete search history.

(56) References Cited

U.S. PATENT DOCUMENTS

| 10,369,900 B1 * | 8/2019 | Conlon ............... H02J 7/00047 |
| 2003/0146726 A1 * | 8/2003 | Ishikawa ................ B60L 50/61 |
| | | 903/903 |

(Continued)

FOREIGN PATENT DOCUMENTS

| CN | 102668229 A | 9/2012 |
| CN | 103560304 A | 2/2014 |

(Continued)

OTHER PUBLICATIONS

The World Intellectual Property Organization (WIPO) International Search Report for PCT/CN2020/135183 Mar. 8, 2021 4 pages (with translation).

*Primary Examiner* — Adi Amrany
(74) *Attorney, Agent, or Firm* — Wenye Tan (57) ABSTRACT

The present disclosure relates to the technical field of vehicles, and provides a vehicle and an energy conversion device and a control method therefor. The energy conversion device includes a motor controller, a bus capacitor, a first switch module, a motor, and a second switch module. By controlling the first switch module and the second switch module to be turned on/off, a motor driving circuit can be formed by a battery pack, the first switch module, the bus capacitor, the motor controller, and the motor, and a charging and discharging circuit can be formed by the battery pack, the second switch module, the motor, the motor controller, and the bus capacitor.

8 Claims, 6 Drawing Sheets

(51) Int. Cl.
*H01M 10/44* (2006.01)
*H01M 10/615* (2014.01)
*H01M 10/625* (2014.01)
*H01M 10/63* (2014.01)
*H02J 7/00* (2006.01)
*H02P 27/08* (2006.01)

(52) U.S. Cl.
CPC ....... *H01M 10/615* (2015.04); *H01M 10/625* (2015.04); *H01M 10/63* (2015.04); *H02J 7/0068* (2013.01); *H02P 27/08* (2013.01); *H01M 2220/20* (2013.01)

(56) References Cited

U.S. PATENT DOCUMENTS

| | | | |
|---|---|---|---|
| 2010/0096926 A1 | 4/2010 | King et al. | |
| 2011/0144861 A1 | 6/2011 | Lakirovich et al. | |
| 2015/0229252 A1 | 8/2015 | Toba | |
| 2017/0166068 A1* | 6/2017 | Kim | H02P 5/74 |
| 2019/0291586 A1* | 9/2019 | Kim | B60L 15/007 |
| 2020/0023746 A1* | 1/2020 | Kim | B60L 53/14 |
| 2020/0180438 A1* | 6/2020 | Shin | H02P 27/06 |
| 2020/0361323 A1* | 11/2020 | Chon | B60L 53/24 |
| 2021/0044135 A1* | 2/2021 | Lee | H02J 7/1492 |
| 2021/0061118 A1* | 3/2021 | Lee | B60L 58/13 |

FOREIGN PATENT DOCUMENTS

| | | |
|---|---|---|
| CN | 204289653 U | 4/2015 |
| CN | 106882181 A | 6/2017 |
| CN | 107592954 A | 1/2018 |
| CN | 107666028 A | 2/2018 |
| CN | 207459113 U | 6/2018 |
| CN | 105762434 B | 12/2018 |
| CN | 110015202 A | 7/2019 |
| CN | 110116653 A | 8/2019 |
| CN | 209479443 U | 10/2019 |
| CN | 110600833 A | 12/2019 |
| CN | 111098760 A | 5/2020 |
| CN | 111347853 A | 6/2020 |
| CN | 108878996 B | 3/2021 |
| JP | 4365010 B2 | 11/2009 |
| JP | 2013187919 A | 9/2013 |

* cited by examiner

```
                                                    ┌─ S10
┌────────────────────────────────────────────────────────┐
│ A first switch module is controlled to be turned on and a second switch │
│ module is controlled to be turned off in response to receiving an instruction │
│ to enter a driving mode, to cause a battery pack, the first switch module, a │
│ bus capacitor, a motor controller, and a motor to form a motor driving │
│                       circuit                          │
└────────────────────────────────────────────────────────┘
```

A first switch module is controlled to be turned on and a second switch module is controlled to be turned off in response to receiving an instruction to enter a driving mode, to cause a battery pack, the first switch module, a bus capacitor, a motor controller, and a motor to form a motor driving circuit — S10

The first switch module is controlled to be turned off and the second switch module is controlled to be turned on in response to receiving an instruction to enter a heating mode, to cause the battery pack, the second switch module, the motor, the motor controller, and the bus capacitor to form a charging and discharging circuit of the battery pack — S20

FIG. 4

A charging and discharging period of a battery pack and a target equivalent current value of a charging and discharging circuit are acquired — S201

A charging and discharging period of the charging and discharging circuit is acquired according to the charging and discharging period of the battery pack, and a duty cycle of a PWM control signal is acquired according to the target equivalent current value of the charging and discharging circuit — S202

VEHICLE, ENERGY CONVERSION DEVICE AND CONTROL METHOD THEREOF

CROSS-REFERENCE TO RELATED APPLICATIONS

The present application a national stage entry under 35 U.S.C. § 371 of International Application No. PCT/CN2020/135183, filed on Dec. 10, 2020, which claims priority to Chinese Patent Application No. 201911409880.7, filed on Dec. 31, 2019, and entitled "VEHICLE, ENERGY CONVERSION DEVICE AND CONTROL METHOD THEREOF", the entire content of all of which is incorporated herein by reference

FIELD

The present disclosure relates to the technical field of vehicles, and more specifically, to a vehicle, an energy conversion device and a control method thereof.

BACKGROUND

Performance of a battery pack varies with an environment in which the battery pack is used as a power source. For example, the performance of the battery pack in a low temperature environment is much lower than that in a normal temperature environment. In order to use the battery pack in the low temperature environment, the battery pack is required to be preheated before use of the battery pack.

Figure 1:
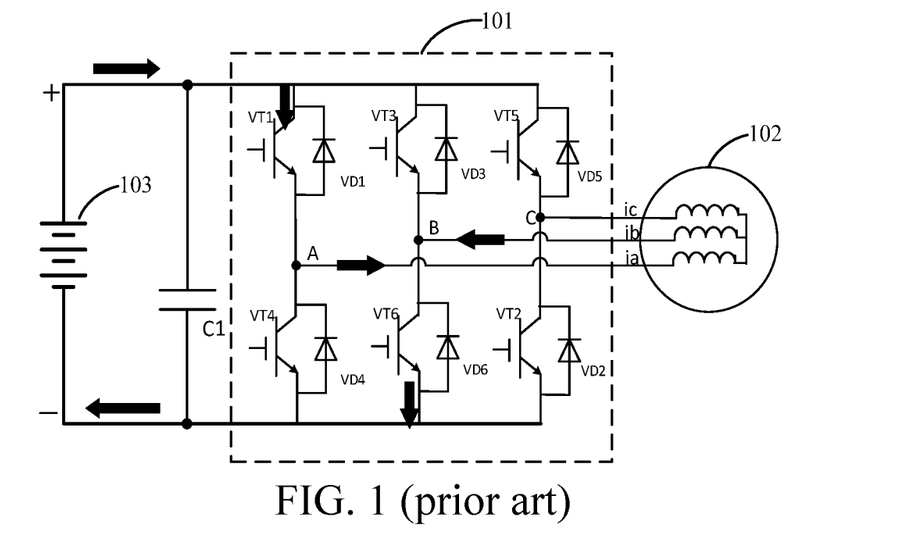
FIG. 1 is a current flow diagram of a motor control circuit in related arts.
Figure 2:
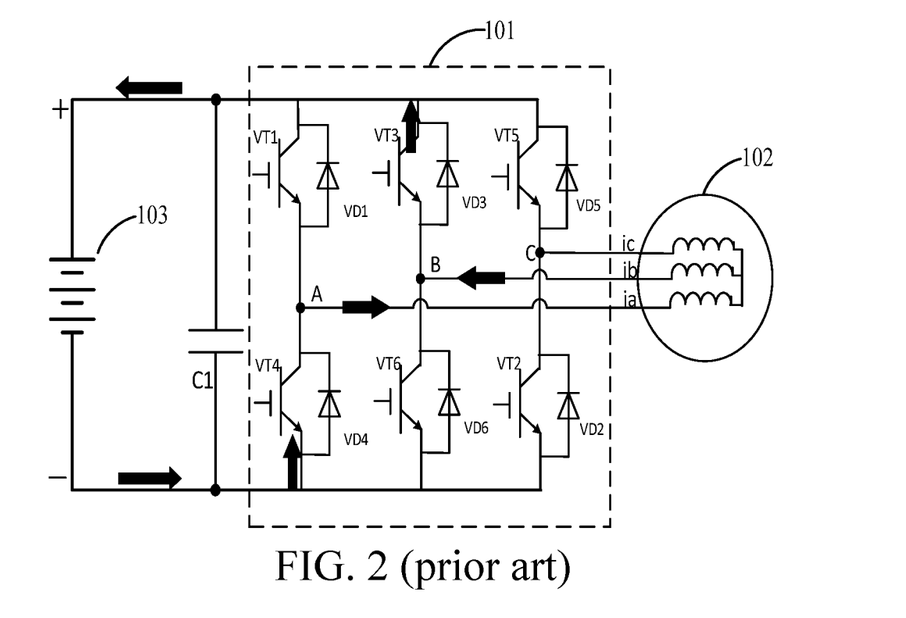
FIG. 2 is another current flow diagram of the motor control circuit in related arts.

A battery pack preheating method is disclosed in related arts. In the technology, as shown in FIG. 1, during discharging of a battery pack 103, a transistor VT1 and a transistor VT6 in a motor controller 101 are triggered to be turned on at the same time. A current flows out from a positive electrode of the battery pack 103, passes through the transistor VT1 and the transistor VT6 and two stator inductors of the motor 102, and returns to a negative electrode of the battery pack 103, and the current rises. Energy is stored in the two stator inductors. As shown in FIG. 2, during charging of the battery pack 103, the transistor VT1 and the transistor VT6 are turned off at the same time. A current flows through the two stator inductors of the motor 102 and the motor controller 101, passes through two bleeder diodes VD4 and VD3, and then returns to the battery pack 102, and the current drops. When the two processes are repeated, batteries are rapidly switched between charging and discharging. Due to internal resistances of the batteries, a large amount of heat is generated inside and a temperature rises rapidly.

In the above technology, since the battery pack 103 can form both a charging and discharging circuit and a motor driving circuit, it is more difficult to control the motor controller. In addition, a bus capacitor C1 exists. During operation of the charging and discharging circuit, a large amount of currents pass through the bus capacitor C1 during discharging of the battery pack 103. As a result, the current flowing through the battery pack significantly decreases, and a heating rate of the battery pack also decreases severely.

SUMMARY

The present disclosure provides a vehicle, an energy conversion device and a control method thereof, to realize separate implementation of a motor driving circuit and a charging and discharging circuit. Therefore, a motor controller can separately control the two circuits to operate, to improve a heating speed of the battery pack.

According to a first aspect, the present disclosure provides an energy conversion device, which includes:
 a motor controller, where first ends of respective bridge arms of the motor controller are connected together to form a first bus terminal and second ends of the respective bridge arms of the motor controller are connected together to form a second bus terminal;
 a bus capacitor, where a first end of the bus capacitor is connected with the first bus terminal, and a second end of the bus capacitor is connected with the second bus terminal and a negative electrode of a battery pack;
 a first switch module, connected between the bus capacitor and a positive electrode of the battery pack;
 a motor, having coils respectively connected with midpoints of the bridge arms of the motor controller; and
 a second switch module, connected between a neutral point of the coils of the motor and the positive electrode or the negative electrode of the battery pack.

According to a second aspect, the present disclosure provides a control method of the energy conversion device based on the first aspect, which includes:
 controlling the first switch module to be turned off and the second switch module to be turned on in response to receiving an instruction to enter a heating mode, to cause a battery pack, the second switch module, the motor, the motor controller, and the bus capacitor to form a charging and discharging circuit of a battery pack; and
 controlling the first switch module to be turned on and the second switch module to be turned off in response to receiving an instruction to enter a driving mode, to cause the battery pack, the first switch module, the bus capacitor, the motor controller, and the motor to form a motor driving circuit.

According to a third aspect, the present disclosure provides a vehicle, which includes the energy conversion device in the first aspect.

According to the vehicle, the energy conversion device and the control method thereof provided in the present disclosure, the energy conversion device includes the motor controller, the bus capacitor, the first switch module, the motor, and the second switch module. By controlling the first switch module and the second switch module to be on/off, the motor driving circuit can be formed by the battery pack, the first switch module, the bus capacitor, the motor controller, and the motor, and the charging and discharging circuit can be formed by the battery pack, the second switch module, the motor, the motor controller, and the bus capacitor. The motor driving circuit is controlled by the motor controller to output torque during the operation, and the motor controller controls a discharging process of the battery pack to the bus capacitor and a charging process of the bus capacitor to the battery pack to be alternately performed while the charging and discharging circuit operates, so as to realize a temperature rise of the battery pack. Therefore, separate implementation of the motor driving circuit and the charging and discharging circuit can be realized, so that the motor controller can separately control the two circuits to operate. In addition, since the bus capacitor participates in the charging and discharging processes in the charging and discharging circuit, a situation in which a large amount of current passes through the bus capacitor during the discharging of the battery pack and results in a significant decrease in the current flowing through the battery pack and a heating rate of the battery pack is prevented. In this way, heating efficiency of the battery pack is enhanced.

BRIEF DESCRIPTION OF THE DRAWINGS

Other features, objectives, and advantages of the present disclosure become clearer by reading the detailed description of non-limiting embodiments that are provided with reference to the following accompanying drawings.

DETAILED DESCRIPTION

To make the objectives, technical solutions and advantages of the present disclosure more apparent and clearer, the following describes the present disclosure in further detail with reference to the accompanying drawings. It should be understood that the specific embodiments described therein are merely used for explaining the present disclosure instead of limiting the present disclosure.

In order to describe the technical solutions of the present disclosure, description is made below by using certain specific embodiments.

Figure 3:
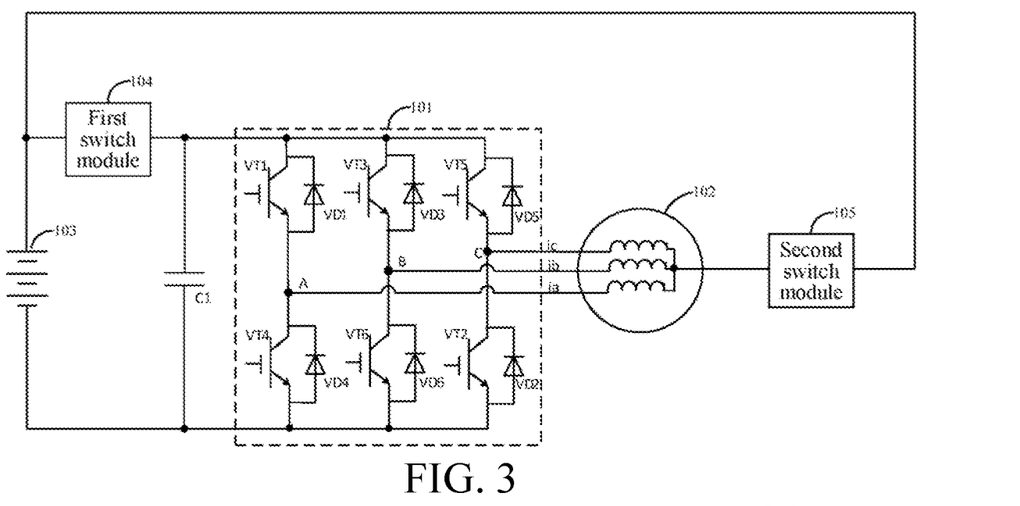
FIG. 3 is a circuit diagram of an energy conversion device according to one embodiment of the present disclosure.

One embodiment of the present disclosure provides an energy conversion device. As shown in FIG. 3, the energy conversion device includes:

a motor controller 101, where first ends of respective bridge arms of the motor controller 101 are connected together to form a first bus terminal, and second ends of respective bridge arms of the motor controller 101 are connected together to form a second bus terminal;

a bus capacitor C1, where a first end of the bus capacitor C1 is connected with the first bus terminal, and a second end of the bus capacitor C1 is connected with the second bus terminal and a negative electrode of a battery pack 103;

a first switch module 104, connected between the bus capacitor C1 and a positive electrode of the battery pack 103;

a motor, having coils respectively connected with midpoints of the bridge arms of the motor controller 101; and a second switch module 105, connected between a neutral point of the coils of the motor and the positive electrode or the negative electrode of the battery pack 103.

The motor controller 101 includes M bridge arms. First ends of each of the M bridge arms are connected together to form the first bus terminal of the motor controller 101, and second ends of each of the M bridge arms are connected together to form the second bus terminal of the motor controller 101. Each bridge arm includes two power switch units connected in series. The power switch unit may be a transistor, an insulated gate bipolar translator (IGBT), a metal-oxide semiconductor (MOS) transistor, or the like. A midpoint of each bridge arm is formed between two power switch units. The motor includes M-phase coils. First ends of each of the M-phase coils are connected with the midpoints of all of the bridge arms in a one-to-one correspondence, and the second ends of each of the M-phase coils are connected together to form a neutral line. The neutral line is connected with the second switch module 105.

When M=3, the motor controller 101 is a three-phase inverter. The three-phase inverter includes three bridge arms. The first ends of each of the three bridge arms are connected together to form the first bus terminal of the motor controller 101, and the second ends of each of the three bridge arms are connected together to form the second bus terminal of the motor controller 101. The three-phase inverter includes a first power switch unit, a second power switch unit, a third power switch unit, a fourth power switch unit, a fifth power switch unit, and a sixth power switch unit. A first bridge arm is formed by the first power switch unit and the fourth power switch unit, a second bridge arm is formed by the second power switch unit and the fifth switch unit, and a third bridge arm is formed by the third power switch unit and the sixth switch unit. One ends of the first power switch unit, the third power switch unit, and the fifth power switch unit are connected together to form the first bus terminal of the three-phase inverter, and one ends of the second power switch unit, the fourth power switch unit, and the sixth power switch unit are connected together to form the second bus terminal of the three-phase inverter.

The motor includes three-phase coils. The first ends of each phase coil in the three-phase coils are connected with the midpoints of each of the three bridge arms in a one-to-one correspondence, and the second ends of each phase coil in the three-phase coils are connected together. A first phase coil of the motor is connected with the midpoint of the first bridge arm, a second phase coil of the motor is connected with the midpoint of the second bridge arm, and the third phase coil of the motor is connected with the midpoint of the third bridge arm.

The first power switch unit in the three-phase inverter includes a first upper bridge arm VT1 and a first upper bridge diode VD1, the second power switch unit includes a second lower bridge arm VT2 and a second lower bridge diode VD2, the third power switch unit includes a third upper bridge arm VT3 and a third upper bridge diode VD3, the fourth power switch unit includes a fourth lower bridge arm VT4 and a fourth lower bridge diode VD4, the fifth power switch unit includes a fifth upper bridge arm VT5 and a fifth upper bridge diode VD5, and the sixth power switch unit includes a sixth lower bridge arm VT6 and a sixth lower bridge diode VD6. The motor is a three-phase four-wire system, and may be a permanent magnet synchronous motor or an asynchronous motor. The three-phase coils are connected with one point and connected with the second switch module 105.

The first switch module 104 is configured to realize connection or disconnection between the battery pack 103 and the bus capacitor C1 according to a control signal, so that the battery pack 103 charges the bus capacitor C1 or stops charging. The second switch module 105 is configured to realize connection or disconnection between the motor and the battery pack 103 according to a control signal, so that the battery pack 103 outputs electric energy to the motor or stops outputting electric energy.

When the first switch module 104 is turned on and the second switch module 105 is turned off, the battery pack 103, the first switch module 104, the motor controller 101, the bus capacitor C1, and the motor 102 form a motor driving circuit. At this time, the motor outputs the power by controlling the motor controller 101.

When the first switch module 104 is turned off and the second switch module 105 is turned on, the battery pack 103, the second switch module 105, the motor 102, the motor controller 101, and the bus capacitor C1 form a charging and discharging circuit. The charging and discharging circuit includes a discharging circuit and a charging circuit. The discharging circuit means that the battery pack 103 discharges the bus capacitor C1 by using the motor 102 and the motor controller 101. In this case, a current flows out from the battery pack 103, and the current flows into the bus capacitor C1 through the motor 102 and the motor controller 101 to charge the bus capacitor C1. The charging circuit means that the bus capacitor C1 charges the battery pack 103 by using the motor and the motor controller 101. In this case, a current flows out from the bus capacitor C1, and the current flows into the battery pack 103 through the motor controller 101 and the motor. The current flows into the battery pack 103. Since an internal resistance exists in the battery pack 103, the current flowing the into and from the battery pack 103 during the operation of the discharging circuit and the charging circuit causes the internal resistance of the battery pack 103 to generate heat, resulting in a temperature rise of the battery pack 103.

According to the energy conversion device provided in one embodiment of the present disclosure, the energy conversion device includes the motor controller 101, the bus capacitor C1, the first switch module 104, the motor, and the second switch module 105. By controlling the first switch module 104 and the second switch module 105 to be turned on/off, the motor driving circuit can be formed by the battery pack 103, the first switch module 104, the bus capacitor C1, the motor controller 101 and the motor, and the charging and discharging circuit can be formed by the battery pack 103, the second switch module 105, the motor, the motor controller 101, and the bus capacitor C1. The motor driving circuit is controlled by the motor controller 101 to output torque during the operation, and the discharging process of the battery pack 103 to the bus capacitor C1 and the charging process of the bus capacitor C1 to the battery pack 103 are controlled by the motor controller 101 to be alternately performed while the charging and discharging circuit operates, so as to realize the temperature rise of the battery pack 103. Therefore, separate implementation of the motor driving circuit and the charging and discharging circuit can be realized, so that the motor controller 101 can separately control the two circuits to operate. In addition, since the bus capacitor C1 participates in the charging and discharging processes in the charging and discharging circuit, a situation in which a large amount of current passes through the bus capacitor C1 during the discharging of the battery pack 103 and results in a significant decrease in the current flowing through the battery pack 103 and a heating rate of the battery pack 103 is prevented. In this way, heating efficiency of the battery pack 103 is enhanced.

In an implementation, during operation of the charging and discharging circuit, the battery pack 103, the second switch module 105, the motor 102, the motor controller 101 form a discharging energy storage circuit, and the battery pack 103, the second switch module 105, the motor 102, the motor controller 101, and the bus capacitor C1 form a discharging energy release circuit, the bus capacitor C1, the motor controller 101, the motor 102, the second switch module 105, and the battery pack 103 form a charging energy storage circuit, and the motor 102, the second switch module 105, the battery pack 103, and the motor controller 101 form a charging energy release circuit.

The discharging circuit includes the discharging energy storage circuit and the discharging energy release circuit, and the charging circuit includes the charging energy storage circuit and the charging energy release circuit. When the discharging energy storage circuit is controlled by the motor controller 101 to operate, the battery pack 103 outputs electric energy, and the coils of the motor store energy. When the discharging energy release circuit is controlled by the motor controller 101 to operate, the battery pack 103 discharges and the coils of the motor release energy, to charge the bus capacitor C1. When the charging energy storage circuit is controlled by the motor controller 101 to operate, the bus capacitor C1 discharges so as to charge the battery pack 103, and the coils of the motor 102 store energy. When the charging energy release circuit is controlled by the motor controller 101 to operate, the coils of the motor 102 release energy to charge the battery pack 103. By controlling the motor controller 101, the discharging process of the battery pack 103 to the bus capacitor C1 and the charging process of the bus capacitor C1 to the battery pack 103 are caused to be alternately performed, to increase a temperature of the battery pack 103. In addition, the value of the current flowing through the charging and discharging circuit is adjusted by controlling a magnitude of the duty cycle of a pulse-width modulation (PWM) control signal of the motor controller 101. Controlling the duty cycle is equivalent to controlling connection durations of an upper bridge arm and a lower bridge arm. After the connection duration of the upper bridge arm or the lower bridge arm is controlled to be longer or shorter, the current in the charging and discharging circuit increases or decreases, so that a heating power generated by the battery pack 103 can be adjusted.

It should be noted that, in the process of controlling the operation of the discharging circuit and the charging circuit, the discharging energy storage circuit in the discharging circuit, the discharging energy release circuit, the charging energy storage circuit, and the charging energy release circuit may be controlled to successively operate. The value of the current flowing through the charging and discharging circuit is adjusted by controlling the magnitude of the duty cycle of the PWM control signal of the motor controller 101. The discharging energy storage circuit and the discharging energy release circuit in the discharging circuit may be controlled to be turned on alternately for discharging, and then the charging energy storage circuit and the charging energy release circuit in the charging circuit may be controlled to be turned on alternately for discharging, and the values of the currents flowing through the discharging circuit and the charging circuit are respectively adjusted by controlling the magnitude of the duty cycle of the PWM control signal of the motor controller 101.

The technical effect in the implementation includes followings. The motor controller 101 is controlled to cause the charging and discharging circuit to operate, so that the battery pack 103 in the discharging circuit discharges to the bus capacitor C1 and the bus capacitor C1 in the charging circuit charges the battery pack 103, thereby increasing the temperature of the battery pack 103. In addition, a current in a self-heating circuit of the battery pack 103 may be adjusted by controlling the motor controller 101, to adjust the heating power generated by the battery pack 103.

Figure 4:
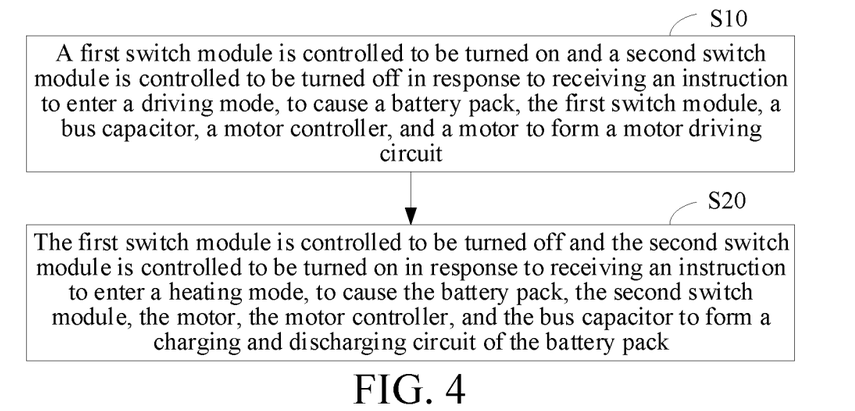
FIG. 4 is a flowchart of a control method for the energy conversion device according to one embodiment of the present disclosure.

Another embodiment of the present disclosure provides a control method for an energy conversion device. As shown in FIG. 4, the control method includes the following steps:

Step S10: The first switch module is controlled to be turned on and the second switch module is controlled to be turned off in response to receiving an instruction to enter a driving mode, to cause the battery pack, the first switch module, the bus capacitor, the motor controller, and the motor to form the motor driving circuit.

When the vehicle needs to output torque, the first switch module is controlled to be turned on and the second switch module is turned off, and the motor driving circuit is controlled to operate by controlling the motor controller, so that the motors outputs power.

Step S20: The first switch module is controlled to be turned off and the second switch module is controlled to be turned on in response to receiving an instruction to enter a heating mode, to cause the battery pack, the second switch module, the motor, the motor controller, and the bus capacitor to form the charging and discharging circuit of the battery pack.

After entering the heating mode, the control method includes: controlling the motor controller to adjust a value of a current flowing through the charging and discharging circuit during the operation of the charging and discharging circuit, to adjust an amount of heat generated by an internal resistance of the battery pack.

The motor may be a three-phase AC motor, and the motor controller may be a three-phase inverter. The battery pack, the three-phase AC motor, the motor controller, and the bus capacitor form the charging and discharging circuit. The charging and discharging circuit includes a discharging circuit and a charging circuit. The discharging circuit means discharging the bus capacitor by the battery pack by using the three-phase AC motor and the three-phase inverter. In this case, a current flows out from the battery pack. The charging circuit means charging of the battery pack by the bus capacitor by using the three-phase AC motor and the three-phase inverter. In this case, a current flows into the battery pack. Since an internal resistance exists in the battery pack, the current flowing into and out of the battery pack during the operation of the discharging circuit and the charging circuit cause the internal resistance of the battery pack to generate heat, which increases a temperature of the battery pack. In order to further control an amount of the heat generated by the internal resistance of the battery pack, it can be controlled by the three-phase inverter. Since the three-phase inverter is connected in series in the charging and discharging circuit, different control signals may be inputted to the three-phase inverter to adjust the value of the current flowing through the charging and discharging circuit, thereby adjusting the heat generated by the internal resistance of the battery pack.

According to the control method for an energy conversion device provided in one embodiment of the present disclosure, the charging and discharging circuit is formed by the battery pack, the three-phase AC motor, the three-phase inverter, and the bus capacitor, and magnitudes of the charging and discharging currents generated in the charging and discharging circuit are controlled by the three-phase inverter. In this way, the internal resistance of the battery pack generates heat, and the temperature of the battery pack increases. Compared with heating by an external liquid flowing through the battery pack, no additional heating device is required, and the heating efficiency of the battery pack is improved.

Figure 5:
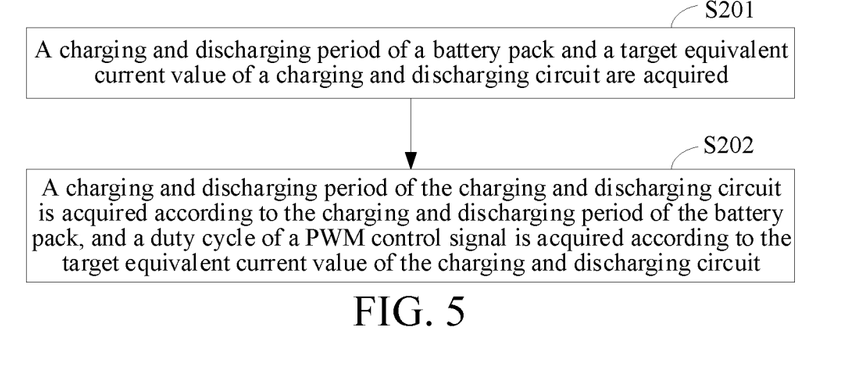
FIG. 5 is another flowchart of the control method for the energy conversion device according to one embodiment of the present disclosure.

In an implementation, when the control method is in a low-frequency control mode, as shown in FIG. 5, before the controlling the motor controller to adjust the value of the current flowing through the charging and discharging circuit, the control method further includes the following steps:

S201: acquiring a charging and discharging period of the battery pack and a target equivalent current value of the charging and discharging circuit.

The charging and discharging period of the battery pack and the target equivalent current value of the charging and discharging circuit are provided by a battery management system. A preset charging and discharging period for the battery pack exists in the battery management system. The battery management system calculates the internal resistance of the battery pack. Discharging/charging may be performed with a specific current in a charging and discharging period, and a current internal resistance of the battery pack may be calculated as $r=\Delta U/\Delta I$. $\Delta U$ is a voltage difference between beginning and ending of battery discharging/charging, and $\Delta I$ is the discharging/charging current. After acquiring the internal resistance of the battery pack, the equivalent current value may be acquired according to the heating power of the battery pack. The target equivalent current value may be calculated according to a formula $P=I^2 r$. P is the heating power, r is the internal resistance of the battery pack, and I is the target equivalent current value. The target equivalent current value may be one value or a group of values.

Step S202: acquiring a charging and discharging period of the charging and discharging circuit according to the charging and discharging period of the battery pack, and acquiring a duty cycle of a PWM control signal according to the target equivalent current value of the charging and discharging circuit.

The charging and discharging period of the charging and discharging circuit is a period of controlling of the upper bridge arm and the lower bridge arm to complete one switch. The duty cycle is a percentage of a duration that the upper bridge arm or the lower bridge arm in the motor controller outputs a high-level signal to the entire charging and discharging period. Controlling the duty cycle means controlling connection durations of the upper bridge arm and the lower bridge arm. During the operation of the charging and discharging circuit, by controlling the connection duration of the upper bridge arm or the lower bridge arm to be longer or shorter, the current in the charging and discharging circuit increases or decreases. For example, the charging circuit may include a charging energy storage circuit and a charging continuous current circuit. When the duty cycle is controlled to increase the connection duration of the charging energy storage circuit, the current in the circuit increases. That is to say, whether the current in the charging and discharging circuit increases or decreases depends on the duty cycle in each period.

The acquisition of the charging and discharging period of the charging and discharging circuit according to the charging and discharging period of the battery pack includes:

configuring the charging and discharging period of the charging and discharging circuit as the charging and discharging period of the battery pack.

The acquisition of the duty cycle of the PWM control signal according to the target equivalent current value of the charging and discharging circuit includes:

acquiring the duty cycle of the PWM control signal according to a pre-stored correspondence between the target equivalent current value and the duty cycle of the PWM control signal.

There is a correspondence between the charging and discharging period of the battery pack and the charging and discharging period of the charging and discharging circuit. In the low-frequency control mode, the charging and discharging period of the charging and discharging circuit is equal to the charging and discharging period of the battery pack. A pre-stored correspondence table of the target equivalent current value and the duty cycle of the PWM control signal may be acquired by means of multiple tests and measurements. In the low-frequency control mode, the number of target current equivalent value in one charging and discharging period is one. The duty cycle of the PWM control signal in the charging and discharging period of the charging and discharging circuit may be obtained according to the above correspondence table.

Further, the controlling the motor controller to adjust a value of a current flowing through the charging and discharging circuit, to adjust an amount of heat generated by an internal resistance of the battery pack includes:

controlling upper and lower bridge arms of the motor controller to be turned on/off according to the charging and discharging period of the charging and discharging circuit and the duty cycle of the PWM control signal, to adjust the value of the current flowing through the charging and discharging circuit, to adjust the amount of the heat generated by the internal resistance of the battery pack.

The charging and discharging period of the charging and discharging circuit includes a charging period and a discharging period. The charging period is an operation period of the charging circuit in the charging and discharging circuit, and the discharging period is an operation period of the discharging circuit in the charging and discharging circuit. One charging and discharging period of the battery pack includes a charging duration and a discharging duration. In the low-frequency control mode, the charging duration is equal to the charging period, and the discharging duration is equal to the discharging period. That is to say, the charging duration includes one charging period of the charging and discharging circuit, and the discharging duration includes one discharging period of the charging and discharging circuit. The charging period is equal to the discharging period. Alternatively, the charging period may not be equal to the discharging period. Control the upper and lower bridge arms of the motor controller to be turned on/off according to the charging period, the discharging period, and the duty cycle of the PWM control signal, and control the discharging energy storage circuit, the discharging energy release circuit, the charging energy storage circuit, and the charging energy release circuit in the charging and discharging circuit to successively operate, and the value of the current flowing through the charging and discharging circuit is adjusted to the equivalent value of the target current, thereby adjusting the heat generated by the internal resistance of the battery pack.

In this implementation, in the low-frequency control mode, the charging and discharging period of the battery pack and the target equivalent current value of the charging and discharging circuit are acquired, the charging and discharging period of the charging and discharging circuit is acquired according to the charging and discharging period of the battery pack, the duty cycle of the PWM control signal is acquired according to the target equivalent current value of the charging and discharging circuit, on/off of the upper and lower bridge arms of the motor controller is controlled according to the duty cycle of the PWM control signal, and the value of the current flowing through the charging and discharging circuit is adjusted to the target equivalent current value. In this implementation, the control is simple, the motor controller generates little heat, and the heating efficiency of the battery pack is improved.

Further, a soft-start mode is also included before entering the low-frequency control mode. In the soft-start mode, an extremely small duty cycle of the PWM control signal is inputted to the motor controller, and the discharging energy storage circuit, the discharging energy release circuit, the charging energy storage circuit, and the charging energy release circuit in the charging and discharging circuit are controlled to successively operate. In this way, the charging and discharging current of the battery is slowly established in a system. Then the duty cycle of the lower bridge arm is gradually increased, so that the charging and discharging current of the battery gradually increases, thereby completing soft-start.

In this implementation, a voltage of the bus capacitor cannot be changed abruptly. If the duty cycle of the motor controller is controlled to change excessively fast, a three-phase current increases sharply, or even an overcurrent occurs, resulting in an overvoltage of the bus capacitor or current oscillation between the bus capacitor and an inductance of the motor coils. By configuring the soft-start process, the above problems can be avoided.

Figure 6:
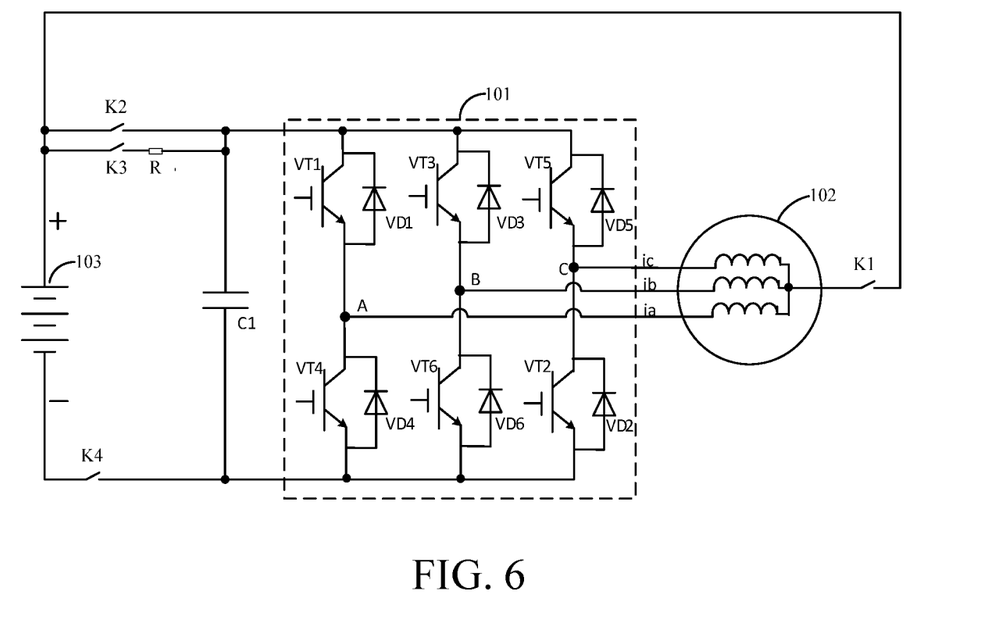
FIG. 6 is a circuit diagram of an energy conversion device according to one embodiment of the present disclosure.

This implementation is described in detail below by using a specific circuit structure:

As shown in FIG. 6, an energy conversion device includes a motor 102, a motor controller 101, a bus capacitor C1, a switch K1, a switch K2, a switch K3, a switch K4, and a resistor R. A neutral point of three-phase coils of the motor 102 is connected with a first end of the switch K1. A second end of the switch K1 is connected with a positive terminal of a battery pack 103, a first end of the switch K2, and a first end of the switch K3. A second end of the switch K3 is connected with a first end of the resistor R. The three-phase coils of the motor 102 are respectively connected with midpoints of three-phase bridge arms of the motor controller 101. A first bus terminal of the motor controller 101 is connected with a first end of the bus capacitor C1, a second end of the switch K2, and a second end of the resistor R. A second bus terminal of the motor controller 101 is connected with a second end of the bus capacitor C1 and a second end of the switch K4, and a first end of the switch K4 is connected with a negative terminal of the battery pack 103.

Figure 7:
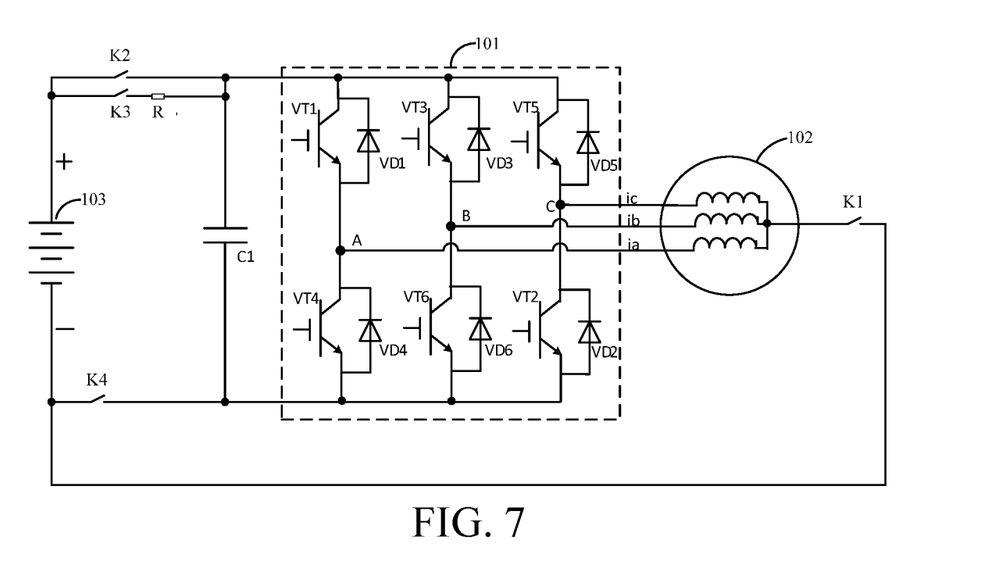
FIG. 7 is another circuit diagram of an energy conversion device according to one embodiment of the present disclosure.

As shown in FIG. 7, in another circuit structure, the second end of the switch K1 is connected with the negative electrode of the battery pack 103.

The motor controller 101 includes a first power switch unit, a second power switch unit, a third power switch unit, a fourth power switch unit, a fifth power switch unit, and a sixth power switch unit. A first bridge arm is formed by the first power switch unit and the fourth power switch unit, a second bridge arm is formed by the third power switch unit and the sixth power switch unit, and a third bridge arm is formed by the fifth power switch unit and the second power switch unit. One ends of the first power switch unit, the third power switch unit, and the fifth power switch unit are connected together to form the first bus terminal of the motor controller, and one ends of the second power switch unit, the fourth power switch unit, and the sixth power switch unit are connected together to form the second bus terminal of the motor controller. A first phase coil of the motor 102 is connected with a midpoint of the first bridge arm. A second phase coil of the motor 102 is connected with a midpoint of the second bridge arm, and a third phase coil of the motor 102 is connected with a midpoint of the third bridge arm.

The first power switch unit in the motor controller 101 includes a first upper bridge arm VT1 and a first upper bridge diode VD1, the second power switch unit includes a first lower bridge arm VT2 and a first lower bridge diode VD2, the third power switch unit includes a second upper bridge arm VT3 and a second upper bridge diode VD3, the fourth power switch unit includes a second lower bridge arm VT4 and a second lower bridge diode VD4, the fifth power switch unit includes a third upper bridge arm VT5 and a third upper bridge diode VD5, and the sixth power switch unit includes a third lower bridge arm VT6 and a third lower bridge diode VD6. The three-phase AC motor is a three-phase four-wire system, and may be a permanent magnet synchronous motor or a asynchronous motor. A neutral line is led out from a connection midpoint of the three-phase coils.

As shown in FIG. 6, when the energy conversion device is not performing a heating function, the switch K1 is kept off and the switch K4 is on. After entering the heating mode, the switch K3 is on for pre-charging. If the pre-charging does not succeed, the mode ends. If the pre-charging succeeds, the switch K1 is controlled to be turned on and K3 is controlled to be turned off immediately to enter a heating state. In this case, the circuit structure in FIG. 6 is equivalent to that shown in FIG. 8.

Figure 8:
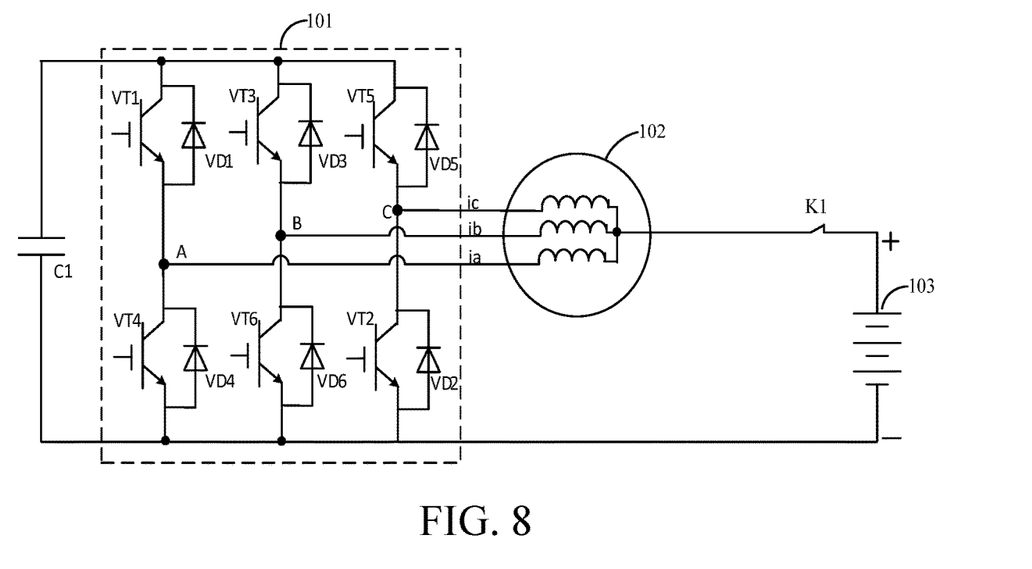
FIG. 8 is another circuit diagram of an energy conversion device according to one embodiment of the present disclosure.

When the motor controller 101 is controlled to be in the low-frequency control mode, the heating state is entered. That is to say, the pre-charging of the bus capacitor C1 is completed, the switch K1 is on, and the switch K3 is off. At this time, a voltage on the bus capacitor C1 is close to a voltage of the battery pack 103, power tubes of the motor controller 101 are all turned off, there is almost no current in the coils of the motor 102, and the system is in a ready state.

First, the soft-start mode is entered. An extremely small duty cycle of the PWM control signal is outputted to the motor controller 101 to cause the charging and discharging circuit to operate. During the operation of the charging and discharging circuit, a discharging energy storage circuit is formed by the battery pack 103, the switch K1, the motor 102, and the motor controller 101, a discharging energy release circuit is formed by the battery pack 103, the switch K1, the motor 102, the motor controller 101, and the bus capacitor C1, a charging energy storage circuit is formed by the bus capacitor C1, the motor controller 101, the motor 102, the switch K1, and the battery pack 103, and a charging energy release circuit is formed by the motor 102, the switch K1, the battery pack 103, and the motor controller 101. By outputting the extremely small duty cycle of the PWM control signal to the motor controller 101 and controlling the discharging energy storage circuit, the discharging energy release circuit, the charging energy storage circuit, and the charging energy release circuit in the charging and discharging circuit to successively operate, the soft start is completed.

Figure 9:
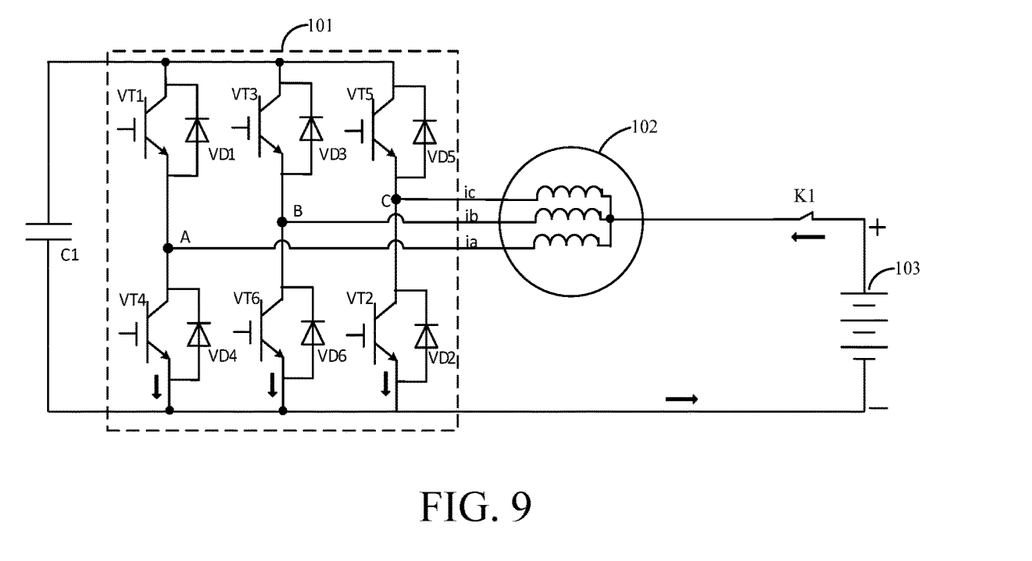
FIG. 9 is a current flow diagram of the energy conversion device according to one embodiment of the present disclosure.

After completing the soft-start process, the heating process starts. A charging and discharging period of the battery pack 103 and a target equivalent current value of the charging and discharging circuit are acquired, and a charging duration and a discharging duration are acquired according to the charging and discharging period of the battery pack 103. The charging duration is equal to the discharging duration. The charging period of the charging and discharging circuit is acquired according to the charging duration, and the discharging period of the charging and discharging circuit is acquired according to the discharging duration. The duty cycle of the PWM control signal is acquired according to the target equivalent current value of the charging and discharging circuit, and control the upper and lower bridge arms of the motor controller 101 to be turned on/off according to the duty cycle of the PWM control signal, so as to control the magnitude of the charging and discharging current of the battery pack 103, thereby causing the heating power inside the battery to reach an expected value. Details are as follows:

A first stage is operation of the discharging energy storage circuit: As shown in FIG. 9, when the lower bridge arm of the motor controller 101 is turned on, a current flows out from the positive electrode of the battery pack 103, passes through the switch K1, the motor 102, and the lower bridge arms (the second lower bridge arm VT2, the fourth lower bridge arm VT4, and the sixth lower bridge arm VT6) of the motor controller 101, and then flows back to the negative electrode of the battery pack 103, and the current continuously increases.

Figure 10:
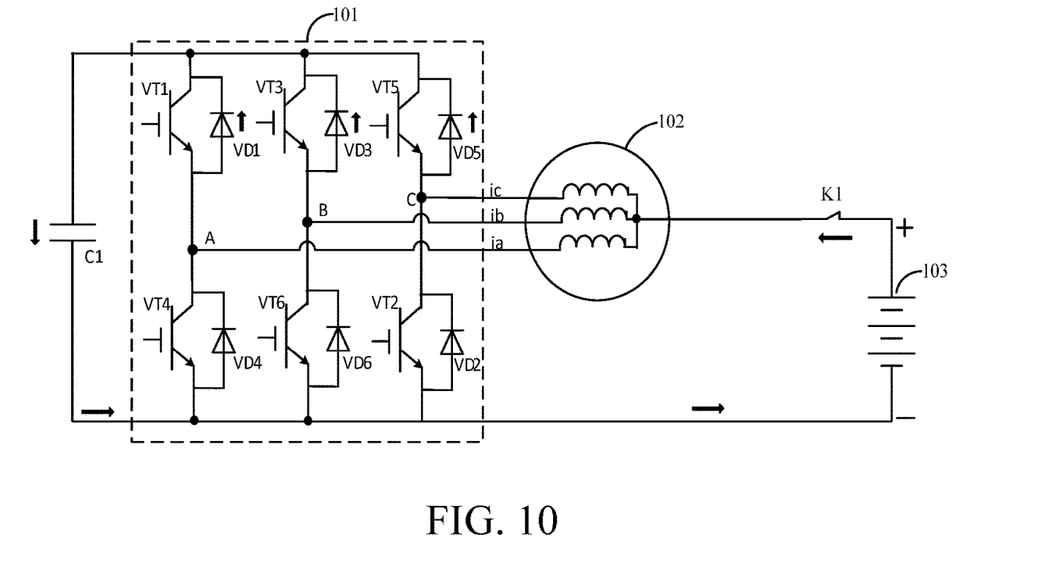
FIG. 10 is a current flow diagram of the energy conversion device according to one embodiment of the present disclosure.

A second stage is operation of a discharging continuous current circuit: As shown in FIG. 10, when the lower bridge arm of the motor controller 101 is turned off and the upper bridge arm is turned on, a current starts from the positive electrode of the battery pack 103, passes through the switch K1, the motor 102, and the upper bridge arms (the first upper bridge diode VD1, the third upper bridge diode VD3, and the fifth upper bridge diode VD5) of the motor controller 101 to charge a positive electrode of the bus capacitor C1. The current continuously decreases to zero, and inductive energy storage decreases to zero. The battery pack 103 and the coil inductance of the motor 102 both perform discharging to charge the bus capacitor C1, so that the voltage of the bus capacitor C1 rises to a maximum value.

Figure 11:
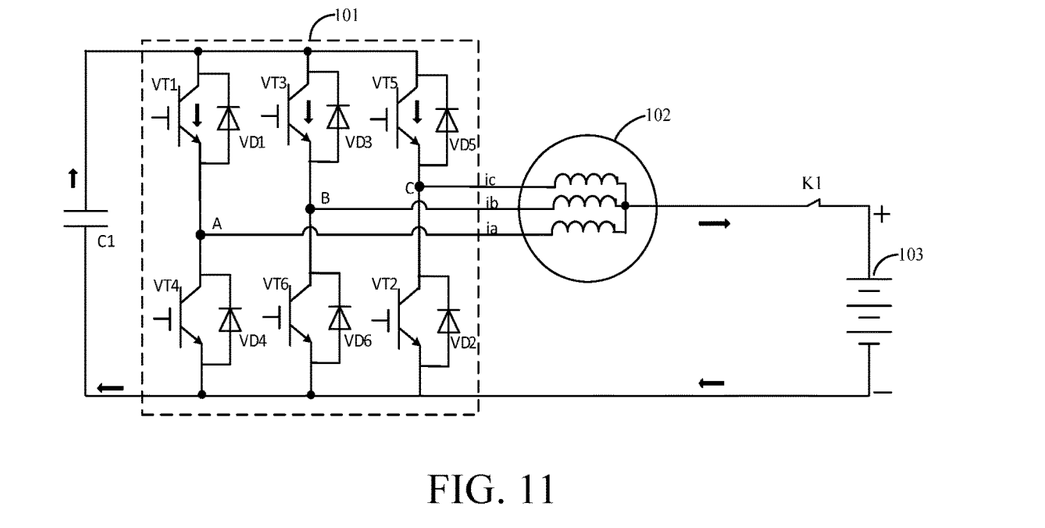
FIG. 11 is a current flow diagram of the energy conversion device according to one embodiment of the present disclosure.

A third stage is operation of the charging energy storage circuit: As shown in FIG. 11, when the lower bridge arm of the control motor controller 101 is controlled to be disconnected, the upper bridge arm is controlled to be closed, and the upper bridge arm of the motor controller 101 is turned on, a current starts from the positive electrode of the bus capacitor C1, and passes through the upper bridge arms (the first upper bridge arm VT1, the third upper bridge arm VT3, and the fifth upper bridge arm VT5) of the motor controller 101, the motor 102, and the switch K1 to charge the positive electrode of the battery pack 103. The current increases and then continuously decreases, and the voltage of the bus capacitor C1 continuously decreases.

Figure 12:
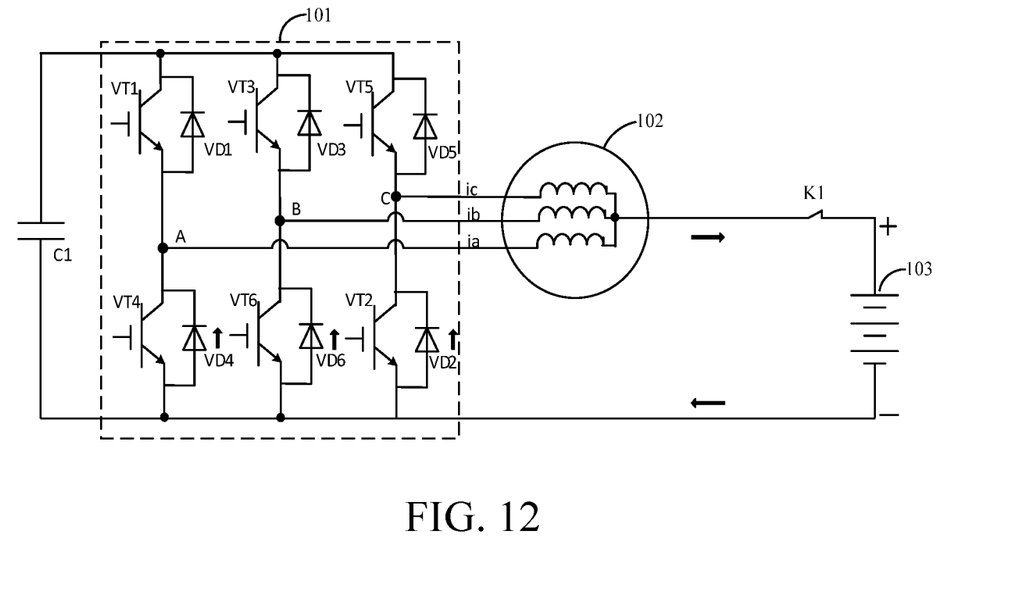
FIG. 12 is a current flow diagram of the energy conversion device according to one embodiment of the present disclosure.

A fourth stage is operation of a charging continuous current circuit: As shown in FIG. 12, when the lower bridge arm of the motor controller 101 is turned on, a current flows out from the negative electrode of the battery pack 103, passes through the lower bridge arms (the second lower bridge diode VD2, the fourth lower bridge diode VD4, and the sixth lower bridge diode VD6) of the motor controller 101, the motor 102, and the switch K1, and then flows back to the positive electrode of the battery pack. The current continuously decreases, and the voltage of the bus capacitor C1 continuously decreases.

In the first stage and the second stage, the battery pack 103 performs discharging to the outside, and the discharging current reaches a maximum value at the end of the first stage. In the third stage and the fourth stage, the battery pack 103 is charged, and the charging current reaches a maximum value at a moment in the third stage. In the second stage, the bus capacitor C1 is charged, and the voltage of the bus capacitor C1 rises to a maximum value. In the third stage, the bus capacitor C1 performs discharging, and the voltage of the bus capacitor C1 drops to a minimum value.

The upper and lower bridge arms of the motor controller 101 are controlled by complementary pulses. In a constant control period, a longer connection duration of the lower bridge arm brings a larger maximum value of the charging and discharging current of the battery pack 103, and a larger maximum voltage of the bus capacitor C1, a larger maximum value of the charging and discharging current of the battery pack 103, and thereby brings a larger heating power of the internal resistance of the battery pack 103. On the contrary, a shorter connection duration of the lower bridge arm brings a smaller maximum value of the charging and discharging current of the battery pack 103, and a smaller maximum voltage of the bus capacitor C1, a smaller maximum value of the charging and discharging current of the battery pack 103, and thereby brings a smaller heating power of the internal resistance of the battery pack 103.

It can be learned from the above that, in the constant period, the charging and discharging current of the battery pack is mainly adjusted by controlling the duty cycle, and the internal heat generation power of the battery pack is positively correlated with the conduction duration of the lower bridge arm. The control period mainly depends on the AC internal resistance of the battery pack, and is selected for a target of a maximum heating power. However, the control period affects a variation range of the voltage of the capacitor. The variation range of the voltage of the capacitor is in a negative correlation with the period. Increasing the duty cycle of the lower bridge arm may increase the charging and discharging current of the battery pack, that is, increasing the internal heating power of the battery. On the contrary, reducing the duty cycle of the lower bridge arm may reduce the charging and discharging current of the battery pack, that is, reducing the heating power inside the battery. In the whole heating process, statuses of related components such as the electric controller and the motor are monitored in real time. If an abnormal current, voltage, or temperature occurs, the heating is immediately stopped to ensure heating safety.

In another implementation, the control method further includes a high-frequency control mode. Before the controlling the motor controller to adjust a value of a current flowing through the charging and discharging circuit, the method further includes the following steps:

Step S301: acquiring the charging and discharging period of the battery pack and a target current waveform of the charging and discharging circuit in the charging and discharging period of the battery pack, where the charging and discharging period of the battery pack includes a charging duration and a discharging duration; the charging duration includes a plurality of charging periods of the charging and discharging circuit; the discharging duration includes a plurality of discharging periods of the charging and discharging circuit.

In this step, the charging and discharging period of the battery pack and the target current waveform of the charging and discharging circuit are provided by the battery management system, and there is a preset charging and discharging period for the battery pack in the battery management system. The target current waveform is a current waveform achieved by controlling the motor controller to adjust the value of the current flowing through the charging and discharging circuit, and the target current waveform satisfies a waveform function. For example, the target current waveform may be a triangle wave, a sine wave, or the like. One charging and discharging period of the battery pack includes a charging duration and a discharging duration. The charging duration is a time consumed by a charging process of the battery pack in one charging and discharging period, and the discharging duration is a time consumed by a discharging process of the battery pack in one charging and discharging period. In the high-frequency control mode, one charging and discharging period of the battery pack includes a plurality of charging periods and a plurality of discharging periods. The charging duration corresponds to a plurality of charging periods, and the discharging duration corresponds to a plurality of discharging periods.

Step S302: Acquiring multiple target equivalent current values corresponding to the target current waveform according to the target current waveform.

In this step, in order to acquire the target current waveform, multiple target equivalent current values that conform to the target current waveform are selected. For example, if the target current waveform satisfies a sine function $I=A \sin \omega t$, time and current values that conform to the function are selected.

Step S303: Acquiring the duty cycle of the PWM control signal according to the target equivalent current value, and acquiring the number of the charging periods included in the charging duration and the number of the discharging periods included in the discharging duration according to the charging and discharging period of the battery pack and the number of the target equivalent current values, where one target equivalent current value corresponds to one charging period or one discharging period.

In this step, the acquisition of the duty cycle of the PWM control signal according to the target equivalent current value of the charging and discharging circuit includes:

acquiring the duty cycle of the PWM control signal according to a pre-stored correspondence between the target equivalent current value and the duty cycle of the PWM control signal.

A correspondence table of the target equivalent current value and the duty cycle of the PWM control signal is pre-stored. The correspondence table may be acquired by means of multiple tests and measurements.

In this step, the acquisition of the number of the charging periods included in the charging duration and the number of the discharging periods included in the discharging duration according to the charging and discharging period of the battery pack and the number of the target equivalent current values includes:

the charging and discharging period of the battery pack, the number of the target equivalent current values, the charging duration, the discharging duration, the charging periods, the discharging periods, the number of the charging periods, and the number of the discharging periods satisfy the following formulas:

$T=T1+T2;$ $T1=N1 \times t1;$ $T2 = N2 \times t2$;

$N = N1 + N2$;

T is the charging and discharging period of the battery pack; T1 is the charging duration; T2 is the discharging duration; t1 is the charging period of the charging and discharging circuit; N1 is the number of the charging periods; t2 is the discharging period of the charging and discharging circuit; N2 is the number of the discharging periods; and N is the number of the target equivalent current values.

N1 target equivalent current values are acquired in the charging duration. Correspondingly, N1 charging periods are acquired, and the N1 charging periods correspond to duty cycles of N1 PWM control signals. N2 target equivalent current values are acquired in the discharging duration. Correspondingly, N2 charging periods are acquired, and the N2 charging periods correspond to duty cycles of N2 PWM control signals.

Further, the controlling the motor controller to adjust a value of a current flowing through the charging and discharging circuit, to adjust an amount of heat generated by an internal resistance of the battery pack includes:

controlling the upper and lower bridge arms of the motor controller to be turned on/off according to the charging periods of the charging and discharging circuit and the quantity thereof, the discharging periods of the charging and discharging circuit and the quantity thereof, and the duty cycle of the PWM control signal, to adjust the value of the current flowing through the charging and discharging circuit, so as to adjust the amount of the heat generated by the internal resistance of the battery pack.

The controlling the upper and lower bridge arms of the motor controller to be turned on/off according to the number of the charging periods, the number of the discharging periods, and the duty cycle of the PWM control signal, to adjust the value of the current flowing through the charging and discharging circuit includes:

acquiring the target equivalent current value corresponding to each charging period and the target equivalent current value corresponding to each discharging period and the duty cycle of the PWM control signal; and controlling the upper and lower bridge arms of the motor controller to be turned on/off in each charging period and each discharging period according to the duty cycle of the PWM control signal, to adjust the value of the current flowing through the charging and discharging circuit to the target equivalent current value.

By adjusting the duty cycle of the PWM control signal in each charging period and each discharging period, the current value in the charging and discharging circuit is caused to be the target equivalent current value, so that the target current waveform is finally formed.

In this implementation, the entire charging and discharging period of the battery pack includes N control periods of the motor controller. The control period is the charging period or the discharging period. Each time the duty cycle of the power tube is adjusted, a direction of variation of the current is changed at the same moment. Increasing the duty cycle of the lower bridge arm increases the discharging current of the battery or reduces the charging current, and reducing the duty cycle of the lower bridge arm reduces the discharging current of the battery pack or increases the charging current. Therefore, by controlling an average duty cycle of N switching controls per charging and discharging period of the battery, the entire charging and discharging current can be increased or reduced. By means of each switching control, the magnitude of the local current may be changed. For example, the current value at a certain point may be increased or reduced. Therefore, by means of the coordinated control of N times duty cycle of the switch tubes, the charging and discharging current of the battery can present a waveform similar to a triangular wave, a sine wave, a square wave, or the like. A proper current waveform is selected according to factors such as actual control requirements, heating power requirements for the battery pack, and a battery life, so that the control can be conveniently realized. The battery heating power becomes larger without affecting battery stability.

Further, after the controlling the upper and lower bridge arms of the motor controller to be turned on/off in each charging period and each discharging period according to the duty cycle of the PWM control signal, to adjust the value of the current flowing through the charging and discharging circuit to the target equivalent current value, the method further includes:

acquiring an actual current value in the charging and discharging circuit; acquiring a duty cycle correction value of a current charging period or a current discharging period according to a relationship between the actual current value and the target equivalent current value, and correcting a duty cycle of a next charging period or a next discharging period according to the duty cycle correction value.

During adjustment of the duty cycle of the PWM control signal in a charging period or a discharging period and acquisition of an actual current value in the charging and discharging circuit in the control period, when the actual current value is not same as the target current value, a current difference between the actual current value and the target equivalent current value is acquired, a duty cycle correction value corresponding to the current difference is acquired according to a correspondence between the current value and the duty cycle of the PWM control signal, and the duty cycle correction value is superimposed with a duty cycle corresponding to the next control period, and then the motor controller is controlled.

In one embodiment, the duty cycle correction value in the current charging period or the current discharging period is acquired through the relationship between the actual current value and the target equivalent current value, and the duty cycle in the next control period is adjusted according to the duty cycle correction value. In this way, the actual current value of the charging and discharging circuit is made accord with the target equivalent current value, so that the current waveform is more accurate.

In one embodiment, by configuring the high-frequency control mode, one target current value corresponds to one discharging period or one charging period of the motor controller. By continuously adjusting the duty cycle of each control period, the effective value of the current flowing through the battery pack can reach any target current value. In this way, the current waveform can be adjusted and is more adaptive.

A working process in the high-frequency control mode is described below by using a specific circuit structure:

As shown in FIG. 6, when the motor controller 101 is controlled to be in the high-frequency control mode, a heating instruction is received, and the heating state is entered. That is to say, the pre-charging of the bus capacitor C1 is completed, the switch K1 is turned on, and the switch K3 is turned off. At this time, a voltage on the bus capacitor C1 is close to a voltage of the battery pack 103, power tubes of the motor controller 101 are all turned off, there is almost no current in the coil inductance of the motor 102, and the system is in a ready state.

First, the soft-start mode is entered. An extremely small duty cycle of the PWM control signal is outputted to the motor controller 101 to cause the charging and discharging circuit to operate. During the operation of the charging and discharging circuit, a discharging energy storage circuit is formed by the battery pack 103, the switch K1, the motor 102, and the motor controller 101, a discharging energy release circuit is formed by the battery pack 103, the switch K1, the motor 102, the motor controller 101, and the bus capacitor C1, a charging energy storage circuit is formed by the bus capacitor C1, the motor controller 101, the motor 102, the switch K1, and the battery pack 103, and a charging energy release circuit is formed by the motor 102, the switch K1, the battery pack 103, and the motor controller 101. By outputting the extremely small duty cycle of the PWM control signal to the motor controller 101 and controlling the discharging energy storage circuit, the discharging energy release circuit, the charging energy storage circuit, and the charging energy release circuit in the charging and discharging circuit to successively operate, the soft start is completed.

Figure 13:
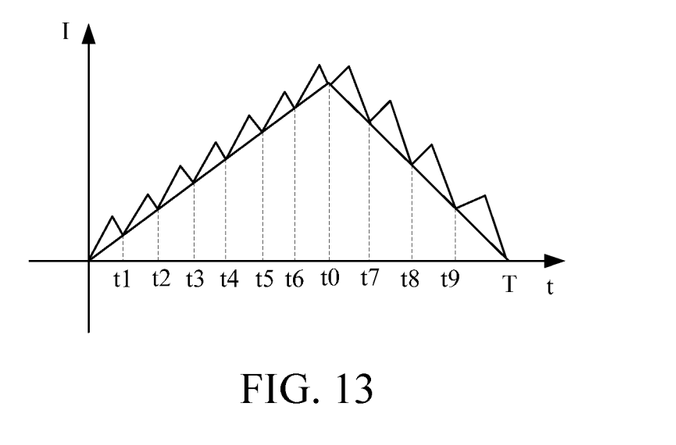
FIG. 13 is a time versus current waveform diagram of the energy conversion device according to one embodiment of the present disclosure.

After completing the soft-start process, the heating process starts. Before starting, six power tubes of the motor controller 101 are all disconnected, and the charging and discharging period of the battery pack 103 is determined first, which is mainly provided by the battery management system. Then a desired current waveform I=akt+b is acquired, where t is a time, i is the target equivalent current value, a and b are constants, and k is a coefficient. As shown in FIG. 13, the charging and discharging period of the battery pack is set as T, the discharging duration is set as t0, and the charging duration is set as T−t0. Within the discharging duration t0, seven target equivalent current values are selected, and a time interval between two equivalent current values is selected as Δt. A current variation is acquired according to I(t+Δt)−I(t), and the duty cycle of the PWM control signal is acquired according to the current variation. The discharging duration corresponds to seven discharging periods. Each discharging period corresponds to a duty cycle of one PWM control signal. Four target equivalent current values are selected within the charging duration, and each charging period corresponds to a duty cycle of one PWM control signal. The motor controller is adjusted according to the duty cycle of the PWM control signal, to cause the current value of the charging and discharging circuit to be the target equivalent current value, so that the heating power inside the battery reaches an expected value. Details include the following stages:

A first stage is operation of the discharging energy storage circuit: As shown in FIG. 9, when the lower bridge arm of the motor controller 101 is turned on, a current flows out from the positive electrode of the battery pack 103, passes through the switch K1, the motor 102, and the lower bridge arms (the second lower bridge arm VT2, the fourth lower bridge arm VT4, and the sixth lower bridge arm VT6) of the motor controller 101, and then flows back to the negative electrode of the battery pack 103, and the current continuously increases.

A second stage is operation of a discharging continuous current circuit: As shown in FIG. 10, when the lower bridge arm of the motor controller 101 is turned off and the upper bridge arm is turned on, a current starts from the positive electrode of the battery pack 103, passes through the switch K1, the motor 102, and the upper bridge arms (the first upper bridge diode VD1, the third upper bridge diode VD3, and the fifth upper bridge diode VD5) of the motor controller 101 to charge a positive electrode of the bus capacitor C1. The current continuously decreases to zero, and inductive energy storage decreases to zero. The battery pack 103 and the coil inductance of the motor 102 both perform discharging to charge the bus capacitor C1, so that the voltage of the bus capacitor C1 rises to a maximum value.

The discharging energy storage circuit and the discharging continuous current circuit are controlled to operate seven times according to seven duty cycles corresponding to the seven discharging periods. Each time the duty cycle of the lower bridge arm is increased, the discharging current of the battery increases, so that the current value of the discharging circuit reaches the target current waveform.

A third stage is operation of the charging energy storage circuit: As shown in FIG. 11, when the lower bridge arm of the control motor controller 101 is controlled to be disconnected, the upper bridge arm is controlled to be closed, and the upper bridge arm of the motor controller 101 is turned on, a current starts from the positive electrode of the bus capacitor C1, and passes through the upper bridge arms (the first upper bridge arm VT1, the third upper bridge arm VT3, and the fifth upper bridge arm VT5) of the motor controller 101, the motor 102, and the switch K1 to charge the positive electrode of the battery pack 103. The current increases and then continuously decreases, and the voltage of the bus capacitor C1 continuously decreases.

A fourth stage is operation of a charging continuous current circuit: As shown in FIG. 12, when the lower bridge arm of the motor controller 101 is turned on, a current flows out from the negative electrode of the battery pack 103, passes through the lower bridge arms (the second lower bridge diode VD2, the fourth lower bridge diode VD4, and the sixth lower bridge diode VD6), the motor 102, and the switch K1 of the motor controller 101, and then flows back to the positive electrode of the battery pack. The current continuously decreases, and the voltage of the bus capacitor C1 continuously decreases.

The charging energy storage circuit and the charging continuous current circuit are controlled to operate four times according to four duty cycles corresponding to the four charging periods, so that the current value of the charging circuit reaches the target current waveform.

Another embodiment of the present disclosure provides a vehicle, which includes the energy conversion device in certain disclosed embodiments.

The foregoing embodiments are merely used for describing the technical solutions of the present disclosure, but are not intended to limit the present disclosure. Although the present disclosure is described in detail with reference to the foregoing embodiments, it should be appreciated by a person skilled in the art that, modifications may still be made to the technical solutions described in the foregoing embodiments, or equivalent replacements may be made to the part of the technical features; as long as such modifications or replacements do not cause the essence of corresponding technical solutions to depart from the spirit and scope of the technical solutions of the embodiments of the present disclosure, the modifications or replacements shall fall within the protection scope of the present disclosure.

What is claimed is:

1. A control method for an energy conversion device including a motor controller, wherein first ends of respective bridge arms of the motor controller are connected together to form a first bus terminal, and second ends of the respective bridge arms of the motor controller are connected together to form a second bus terminal; a bus capacitor, wherein a first end of the bus capacitor is connected with the first bus terminal, and a second end of the bus capacitor is connected with the second bus terminal and a negative electrode of a battery pack; a first switch module, connected between the bus capacitor and a positive electrode of the battery pack; a motor, having coils respectively connected with midpoints of the bridge arms of the motor controller; and a second switch module, connected between a neutral point of the coils of the motor and the positive electrode or the negative electrode of the battery pack, wherein the bridge arms of the motor controller includes upper and lower bridge arms configured to be turned on/off according to a duty cycle of a pulse width modulation (PWM) control signal to control a magnitude of a charging and discharging current of the battery pack, the method comprising:
  controlling the first switch module to be turned off and the second switch module to be turned on in response to receiving an instruction to enter a heating mode, to cause a battery pack, the second switch module, the motor, the motor controller, and the bus capacitor to form a closed charging and discharging circuit of the battery pack; and
  controlling the first switch module to be turned on and the second switch module to be turned off in response to receiving an instruction to enter a driving mode, to cause the battery pack, the first switch module, the bus capacitor, the motor controller, and the motor to form a closed motor driving circuit,
  wherein after entering the heating mode, the control method comprises:
  controlling the motor controller to adjust a value of a current flowing through the charging and discharging circuit, to adjust an amount of heat generated by an internal resistance of the battery pack;
  wherein before the controlling the motor controller to adjust a value of a current flowing through the charging and discharging circuit, the method further comprises:
  acquiring a charging and discharging period of the battery pack and a target equivalent current value of the charging and discharging circuit;
  acquiring a charging and discharging period of the charging and discharging circuit according to the charging and discharging period of the battery pack, and acquiring the duty cycle of the PWM control signal according to the target equivalent current value of the charging and discharging circuit; and
  the controlling the motor controller to adjust a value of a current flowing through the charging and discharging circuit, to adjust an amount of heat generated by an internal resistance of the battery pack comprises:
  controlling the upper and lower bridge arms of the motor controller to be turned on/off according to a charging period and a discharging period of the charging and discharging circuit and the duty cycle of the PWM control signal, to adjust the value of the current flowing through the charging and discharging circuit, so as to adjust the amount of the heat generated by the internal resistance of the battery pack.

2. The control method according to claim 1, wherein the acquiring the charging period and discharging period of the charging and discharging circuit according to the charging and discharging period of the battery pack comprises:
  configuring the charging and discharging period of the charging and discharging circuit as the charging and discharging period of the battery pack; and
  the acquiring the duty cycle of the PWM control signal according to the target equivalent current value of the charging and discharging circuit comprises:
  acquiring the duty cycle of the PWM control signal according to a pre-stored correspondence between the target equivalent current value and the duty cycle of the PWM control signal.

3. A control method for an energy conversion device including a motor controller, wherein first ends of respective bridge arms of the motor controller are connected together to form a first bus terminal, and second ends of the respective bridge arms of the motor controller are connected together to form a second bus terminal; a bus capacitor, wherein a first end of the bus capacitor is connected with the first bus terminal, and a second end of the bus capacitor is connected with the second bus terminal and a negative electrode of a battery pack; a first switch module, connected between the bus capacitor and a positive electrode of the battery pack; a motor, having coils respectively connected with midpoints of the bridge arms of the motor controller; and a second switch module, connected between a neutral point of the coils of the motor and the positive electrode or the negative electrode of the battery pack, wherein when the first switch module is turned on and the second switch module is turned off, a motor driving circuit is formed by the battery pack, the first switch module, the bus capacitor, the motor controller, and the motor; and when the first switch module is turned off and the second switch module is turned on, a charging and discharging circuit is formed by the battery pack, the second switch module, the motor, the motor controller, and the bus capacitor, the method comprising:
  controlling the first switch module to be turned off and the second switch module to be turned on in response to receiving an instruction to enter a heating mode, to cause a battery pack, the second switch module, the motor, the motor controller, and the bus capacitor to form the charging and discharging circuit of the battery pack;
  acquiring the charging and discharging period of the battery pack and a target current waveform of the charging and discharging circuit in the charging and discharging period of the battery pack, wherein the charging and discharging period of the battery pack comprises a charging duration and a discharging duration; the charging duration comprises a plurality of charging periods of the charging and discharging circuit; the discharging duration comprises a plurality of discharging periods of the charging and discharging circuit;
  acquiring a plurality of target equivalent current values corresponding to the target current waveform according to the target current waveform;
  acquiring the duty cycle of the PWM control signal according to the target equivalent current value, and acquiring, according to the charging and discharging period of the battery pack and a number of the target equivalent current values, a number of the charging periods comprised in the charging duration and a number of the discharging periods comprised in the discharging duration, wherein one target equivalent current value corresponds to one charging period or one discharging period;
  controlling the motor controller to adjust a value of a current flowing through the charging and discharging circuit, to adjust an amount of heat generated by an internal resistance of the battery pack; and controlling the first switch module to be turned on and the second switch module to be turned off in response to receiving an instruction to enter a driving mode, to cause the battery pack, the first switch module, the bus capacitor, the motor controller, and the motor to form the motor driving circuit.

4. The control method according to claim 3, wherein the acquiring, according to the charging and discharging period of the battery pack and a number of the target equivalent current values, a number of the charging periods comprised in the charging duration and a number of the discharging periods comprised in the discharging duration comprises:

the charging and discharging period of the battery pack, the number of the target equivalent current values, the charging duration, the discharging duration, the charging periods, the discharging periods, the number of the charging periods, and the number of the discharging periods satisfy the following formulas:

$$T=T1+T2;$$

$$T1=N1 \times t1;$$

$$T2=N2 \times t2;$$

$$N=N1+N2;$$

T is the charging and discharging period of the battery pack; T1 is the charging duration; T2 is the discharging duration; t1 is the charging period of the charging and discharging circuit; N1 is the number of the charging periods; t2 is the discharging period of the charging and discharging circuit; N2 is the number of the discharging periods; and N is the number of the target equivalent current values.

5. The control method according to claim 3, wherein the acquiring a duty cycle of a PWM control signal according to the target equivalent current value of the charging and discharging circuit comprises:

acquiring the duty cycle of the PWM control signal according to a pre-stored correspondence between the target equivalent current value and the duty cycle of the PWM control signal.

6. The control method according to claim 5, wherein the controlling the motor controller to adjust a value of a current flowing through the charging and discharging circuit, to adjust an amount of heat generated by an internal resistance of the battery pack comprises:

controlling the upper and lower bridge arms of the motor controller to be turned on/off according to the charging periods of the charging and discharging circuit and the quantity thereof, the discharging periods of the charging and discharging circuit and the quantity thereof, and the duty cycle of the PWM control signal, to adjust the value of the current flowing through the charging and discharging circuit, so as to adjust the amount of the heat generated by the internal resistance of the battery pack.

7. The control method according to claim 6, wherein the controlling on/off of the upper and lower bridge arms of the motor controller according to the number of the charging periods, the number of the discharging periods, and the duty cycle of the PWM control signal, to adjust the value of the current flowing through the charging and discharging circuit comprises:

acquiring the target equivalent current value corresponding to each charging period and the target equivalent current value corresponding to each discharging period and the duty cycle of the PWM control signal; and controlling the upper and lower bridge arms of the motor controller to be turned on/off in each charging period and each discharging period according to the duty cycle of the PWM control signal, to adjust the value of the current flowing through the charging and discharging circuit to the target equivalent current value.

8. The control method according to claim 7, wherein after the controlling the upper and lower bridge arms of the motor controller to be turned on/off in each charging period and each discharging period according to the duty cycle of the PWM control signal, to adjust the value of the current flowing through the charging and discharging circuit to the target equivalent current value, the method further comprises:

acquiring an actual current value in the charging and discharging circuit; acquiring a duty cycle correction value of a current charging period or a current discharging period according to a relationship between the actual current value and the target equivalent current value, and correcting a duty cycle of a next charging period or a next discharging period according to the duty cycle correction value.

* * * * *